(12) United States Patent
Seaberg

(10) Patent No.: US 6,227,504 B1
(45) Date of Patent: May 8, 2001

(54) BLANK CONSTRUCTION AND CARD STAND

(76) Inventor: Seth Seaberg, Elm St., Damariscotta, ME (US) 04543

( * ) Notice: Subject to any disclaimer, the term of this patent is extended or adjusted under 35 U.S.C. 154(b) by 0 days.

(21) Appl. No.: 09/084,801

(22) Filed: May 26, 1998

(51) Int. Cl.$^7$ .................................................. A45D 19/04
(52) U.S. Cl. .................. 248/174; 248/176.1; 248/188.6; 248/309.1; 40/124.09; 40/745
(58) Field of Search .................... 248/174, 176.1, 248/188.6, 459, 309.1, 467, 205.3; 40/124.09, 124.12, 124.14, 745, 751, 761

(56) References Cited

U.S. PATENT DOCUMENTS

| | | | |
|---|---|---|---|
| 2,834,135 | * | 5/1958 | Clarke ...................................... 40/750 |
| 3,198,339 | * | 8/1965 | Stolarz ..................................... 211/50 |
| 3,473,777 | * | 10/1969 | Ketterer ................................. 248/459 |
| 4,696,118 | * | 9/1987 | Cross ...................................... 40/120 |
| 5,531,038 | * | 7/1996 | Keith .................................. 40/124.04 |
| 5,595,008 | * | 1/1997 | Johnson .............................. 40/124.04 |
| 5,715,618 | * | 2/1998 | Whang .................................... 40/119 |
| 5,782,452 | * | 7/1998 | Bosworth ............................. 248/459 |
| 6,006,457 | * | 12/1999 | Tranpsort ............................. 40/124.4 |

* cited by examiner

*Primary Examiner*—Anita M. King
*Assistant Examiner*—N. Morrison
(74) *Attorney, Agent, or Firm*—Wallenstein & Wagner, LTD

(57) ABSTRACT

The present invention discloses blanks and the stands formed therefrom for holding and supporting cards. The stand can display creased greeting cards either horizontally or vertically. The blank includes a triangular-shaped base section having in its first adaptation, a pair of diverging side panels and diverging foldable joints, and in its second adaptation, a pair of opposed side panels and parallel foldable joints. Adhesive means are further provided for attaching and placing the blank/stand in the desired position and location.

30 Claims, 9 Drawing Sheets

BLANK CONSTRUCTION AND CARD STAND

DESCRIPTION

1. Technical Field

This invention relates generally to blank constructions and stands or displays made therefrom, and more particularly, to a blank construction foldable into a card display for the display of horizontally and vertically creased greeting cards.

2. Background of the Invention

Greeting cards are used today not only as a communication between sender and recipient, but also as interior decor on the part of the recipient, and in many cases the purchaser. Home owners have long enjoyed displaying seasonal greeting cards in and around the home, atop the mantelpiece, window sill, or on a string. Retail store owners frequently use folded plain white cards in their stores for advertising merchandise and other practical applications. Folded greeting cards and other cards come in a number of sizes. When folded, they generally measure approximately 5 inches in width and 7 inches in length. Although generally cards of this nature are printed on so as to fold and open/close/display along a vertical crease along the length, like a book, a number of cards are printed to fold and open/close/display along a horizontal crease along the length, such as a calendar. At present, greeting cards and other cards with one or more creases are displayed in the home or in retail environments either free-standing on a flat surface, or attached with tape, thumbtacks, or other devices and materials for affixing the card to a surface. In a free-standing mode, a greeting card is subject to tipping over by a draft, being inadvertently jarred, or collapsing under their own weight. Moreover, being displayed by means of tape, thumbtacks, or other devices frequently damages both the card and the surface to which it is attached, upon removal.

Attempts have been made to construct a card display capable of preserving the integrity of the card while affording an attractive option for display. Despite these, there is still a need for an economical, disposable, small, unobtrusive, virtually invisible card stand that allows users to display cards in the most conventional formats with which they are familiar: slightly opened and occupying a small amount of space.

In addition, there is a need for a card display that can be adapted to display both cards creased horizontally (like a calendar) and cards creased vertically (like a book). There is also a further need, due to lack of adequate mantelpiece area or shelf space, and in other places with limited display space such as college dormitory rooms, to display cards horizontally or vertically atop, below or along any flat surface.

SUMMARY OF THE INVENTION

The present invention satisfies these just noted needs and concerns. According to a first adaptation of the present invention, a display or stand is formed of a blank construction for displaying a greeting card or other similar card with a crease forming leaves. This embodiment of a display, or blank, includes a substantially triangular-shaped substantially flat base section with a top surface and a bottom surface, having in its first adaptation, a pair of diverging side panels and diverging foldable joints. Alternatively, in its second adaptation, a pair of opposed side panels and parallel foldable joints.

In the first adaptation of this invention, the blank construction is adapted to a user's preference by folding two side panels substantially perpendicular to a base. The blank construction comprises a left side panel (first side panel) disposed adjacent to one side of the base adapted to be foldable along a first preformed foldable joint positioned therebetween. A right side panel (second side panel) is disposed adjacent to another side of the base and is adapted to be foldable along a second preformed foldable joint positioned therebetween. In the first adaptation, the left side panel (first side panel) and the right side panel (second side panel) are angular to one another, and in the preferred embodiment are disposed at such an angle as to typify the one at which partially opened cards are conventionally displayed.

According to the first adaptation, as a result of the above described construction and folding, a wedge-shaped display or stand is formed, to which the lower edges adjacent to the crease of a greeting card or other card with at least two leaves may be affixed. The base is then applied to a surface such as a mantelpiece, shelf, or window sill.

According to a further aspect of the invention, the bottom of the left side panel of the blank construction includes an adhesive thereon for adhering the left side panel (first side panel) to an edge adjacent to the crease of a greeting card or other card. The bottom of the right side panel (second side panel) of the blank construction includes an adhesive thereon for adhering the right side panel (second side panel) to the opposite edge adjacent to the crease of a greeting card or other card. The base includes an adhesive thereon for adhering the base to a plurality of surfaces. All panels including adhesive thereon further include a removable liner applied thereto, preventing the adhesive from losing its properties of adhesion and providing other obvious protective advantages prior to the invention's use.

In the second adaptation of this invention, the blank construction is adapted to a user's preference by folding two side panels substantially perpendicularly to a base. The blank construction comprises a left side panel (third side panel) disposed adjacent to one side of the base adapted to be foldable along a first preformed foldable joint positioned therebetween. A right side panel (fourth side panel) is disposed adjacent to another side of the base and is adapted to be foldable along a second preformed foldable joint positioned therebetween. In the second adaptation, the left side panel (third side panel) and the right side panel (fourth side panel) are parallel to one another, and in the preferred embodiment are disposed at such an angle as to typify the one at which partially opened cards are conventionally displayed.

According to the second adaptation, as a result of the above described construction and folding, a U-shaped display or stand is formed, to which the lower edges parallel and opposed to the crease of a greeting card or other card at least two leaves may be affixed. The base is then applied to a surface such as a mantelpiece, shelf, or window sill.

According to a further aspect of the invention, the bottom of the left side panel (third side panel) of the blank construction includes an adhesive thereon for adhering the left side panel (third side panel) to an edge parallel and opposed to the crease of a greeting card or other card. The bottom of the right side panel (fourth side panel) of the blank construction includes an adhesive thereon for adhering the right side panel (fourth side panel) to the other edge parallel and opposed to the crease of a greeting card or other card. The base includes an adhesive thereon for adhering the base to a plurality of surfaces. All panels including adhesive thereon further include a removable liner applied thereto, preventing the adhesive from losing its properties of adhesion and providing other obvious protective advantages prior to the invention's use.

A single coating or lamination on one surface of the blank will serve as protection and/or indicia on all the top surfaces of the display or stand.

DETAILED DESCRIPTION

Figure 1A:
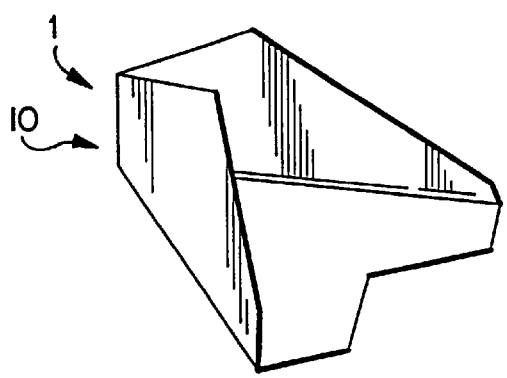
FIG. 1A is a perspective view of a first adaptation of the card display made in accordance with the teachings of the present invention.
Figure 1B:
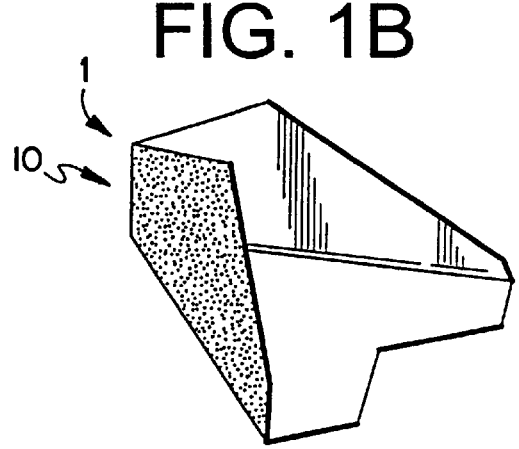
FIG. 1B is a perspective view of the first adaptation as shown in FIG. 1A, with the protective liner removed.
Figure 2A:
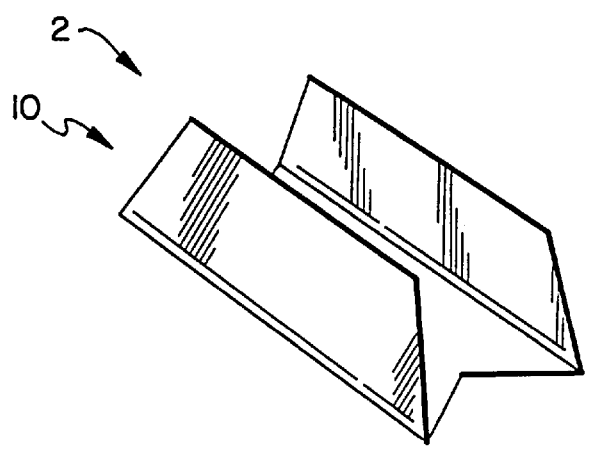
FIG. 2A is a perspective view of a second adaptation of the card display.
Figure 2B:
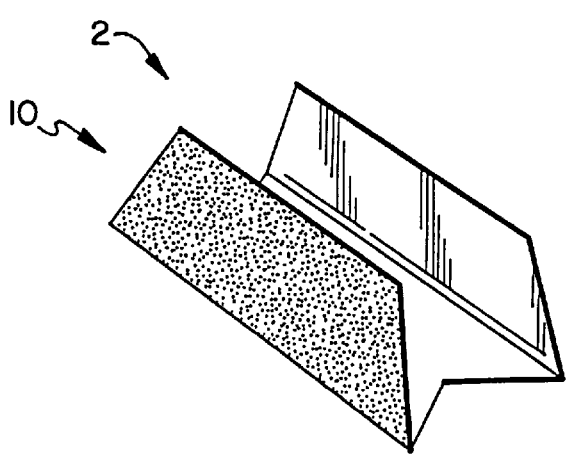
FIG. 2B is a perspective view of the second adaptation as shown in FIG. 2A, with the protective liner removed.

While this invention is susceptible of embodiment in many different forms, there is shown in the drawings and will herein be described in detail preferred embodiments of the invention with the understanding the present disclosure is to be considered an exemplification of the principles of the invention and is not intended to limit the broad adaptation of the invention to the embodiments illustrated.

As shown, FIGS. 1A–21, set forth preferred embodiments, each having first and second adaptations, of a card display for standing and holding cards with at least one crease therein resulting in at least two leaves being formed thereby. Each adaptation, generally designed 1 for the first adaptation and 2 for the second adaption, is formed of a blank construction, generally designated 10. The blank 10 includes a plurality of panels foldable at angles to one another. The blank 10 has two surfaces, those being a top surface 15 and a bottom surface 20.

Figure 3:
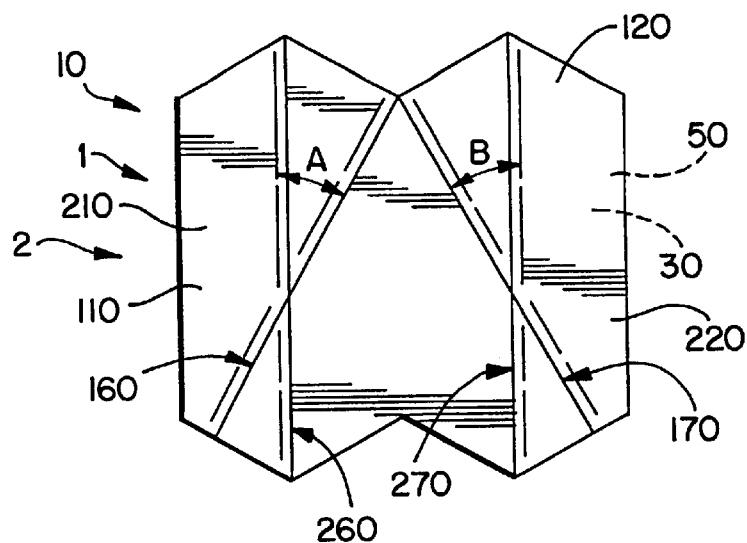
FIG. 3 is a top plan view of a blank construction in the open, unfolded position used to construct the first and second adaptations of the card display of FIGS. 1A and 2A.

Turning to FIG. 3, the blank 10 is an irregular flat polygon which includes four preformed folds 160, 170, 260, 270. In the preferred embodiment, the blank 10 measures approximately 2¼ inches by 2¼ inches. The preferred embodiment is constructed to facilitate use in two adaptations 1, 2 of the invention. The card stand arrives to the user in this flat form, i.e., this allows the user to decide whether a more appropriate mode of use is in the first adaptation of the card display 1 or the second adaptation of the card display 2, depending on the orientation of the card to be mated with the display. Furthermore, this flat form 10 facilitates inexpensive manufacture, shipping and packaging, as well as being convenient to insert in an envelope along with a greeting card or similar creased card.

As shown in FIG. 3, the linear first foldable joint 160 intersects the linear third foldable joint 260 at an angle A of 30 degrees, and the linear second foldable joint 170 intersects the linear fourth foldable joint 270 at an angle B of 30 degrees.

Figure 4:
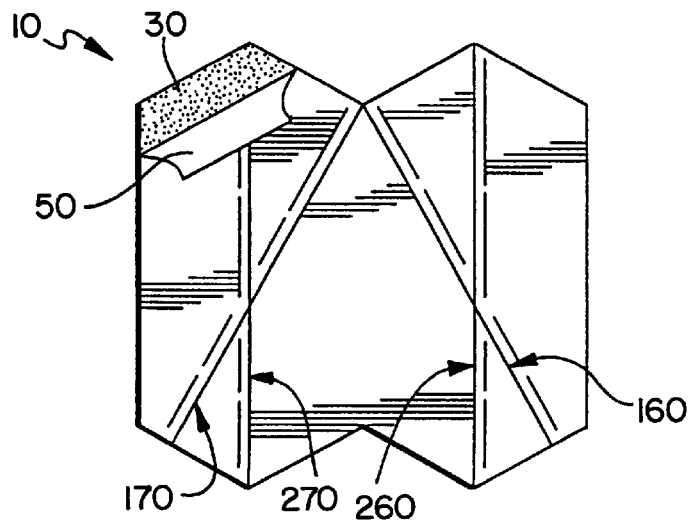
FIG. 4 is a bottom plan view of the blank construction of FIG. 3 shown with the protective liner partially removed from the adhesive bottom.
Figure 5:
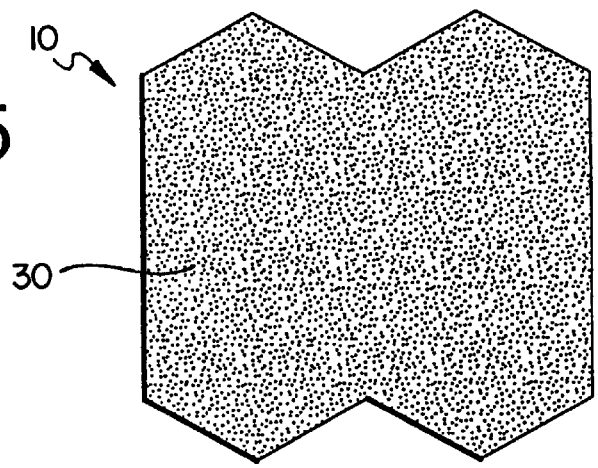
FIG. 5 is a bottom plan view of the blank construction of FIG. 3 shown with the protective liner completely removed from the adhesive bottom.

The blank 10 has an adhesive layer 30 on the bottom surface 20 thereof (FIG. 4). A conventional, well-known removable protective liner 50 is applied to the adhesive layer 30 to prevent unwanted adherence of the blank to a surface during manufacture, shipping or handling by the manufacturer or user. This liner 50 is removable to expose the adhesive layer 30. To facilitate easy folding of the side panels 110, 120, 210, 220, the linear foldable joints 160, 170, 260, 270 are creased, perforated or scored before being shipped from the manufacturer.

The Blank in Its First Adaptation

Figure 6:
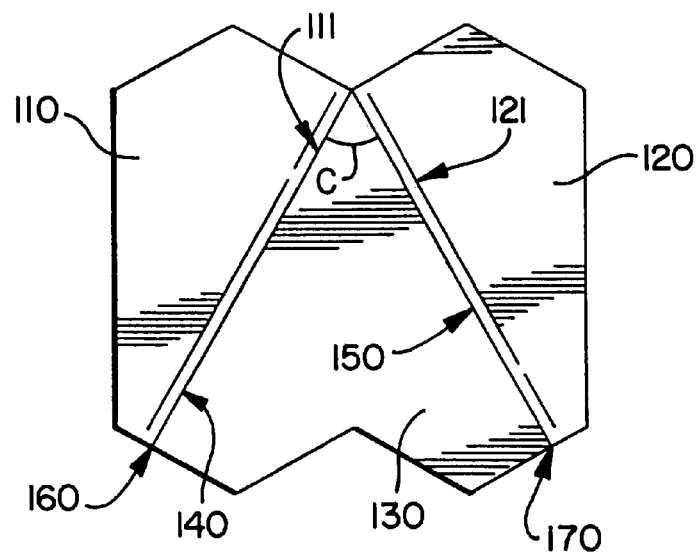
FIG. 6 is a top plan view of the blank construction in the open, unfolded position used to construct the first adaptation of the card display of FIG. 1A.
Figure 7:
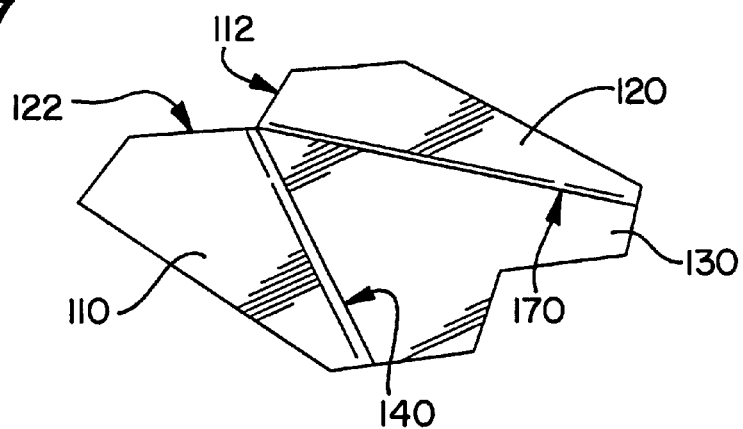
FIG. 7 is a perspective view of the blank construction in the open, unfolded position used to construct the first adaptation of the card display of FIG. 1A.
Figure 8:
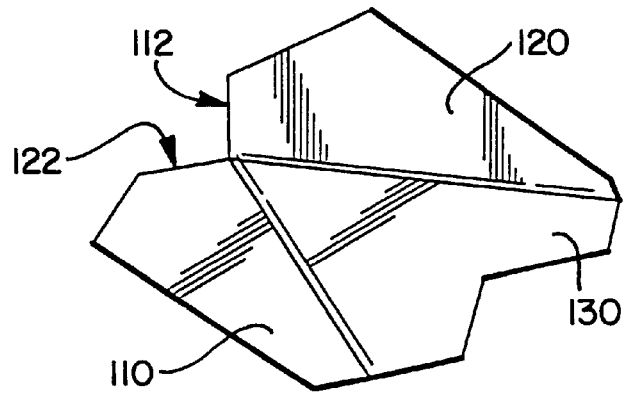
FIG. 8 is a perspective view of the blank construction of FIG. 7 after a first fold to the blank.

For clarity, FIGS. 6–13 showing the first adaptation 1, the linear third foldable joint 260 and linear fourth foldable joint 270 are omitted. As shown in FIG. 6, a preferred embodiment of the first adaptation of a card display 1 for standing cards is formed of a blank construction 10. A contiguous irregularly shaped left side panel 110 having a right side (edge 111) is positioned contiguous and adjacent to the left side (edge 140) of the base section 130. The base 130 and the left side panel 110 are foldably joined either along or adjacent to the left side 140 of the base 130 and the right side 111 of the left side panel by a linear first foldable joint 160. A contiguous irregularly shaped right panel 120 having a left side (edge 121) is positioned contiguous and adjacent to the right side (edge 150) of the base section 130. The base 130 and the right side panel 120 are foldably joined either along or adjacent to the right side 150 of the base 130 and the left side 121 of the right side panel by a linear second foldable joint 170. The linear first foldable joint 160 and the linear second foldable joint 170 (used to facilitate the first adaptation of the present invention) form an apex C, or angle C, at the top of the base section 130. This angle C is approximately 60 degrees.

The Blank in Its Second Adaptation

Figure 14:
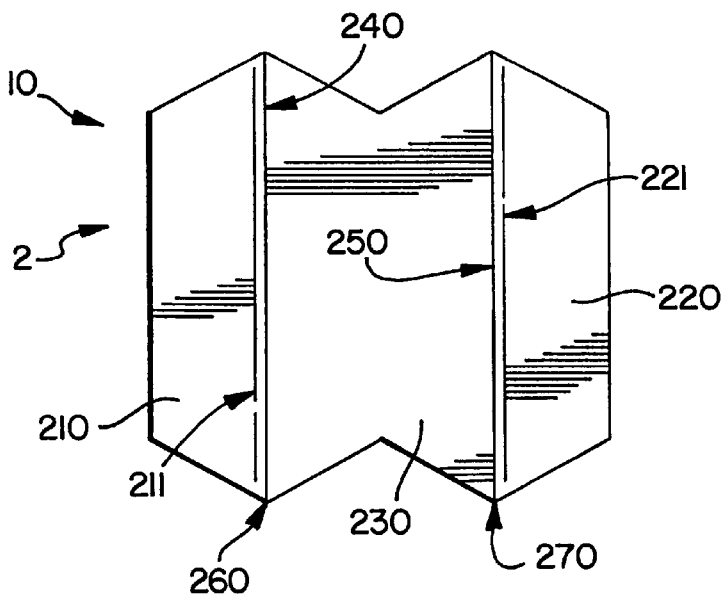
FIG. 14 is a top plan view of the blank construction in the open, unfolded position used to construct the second adaptation of the card display of FIG. 2.
Figure 15:
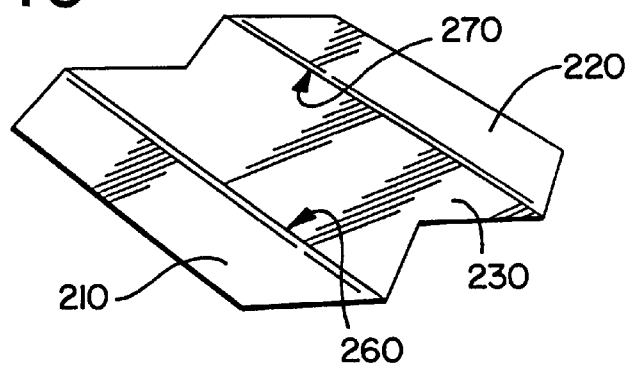
FIG. 15 is a perspective view of the blank construction in the open, unfolded position used to construct the second adaptation of the card display of FIG. 2A.
Figure 16:
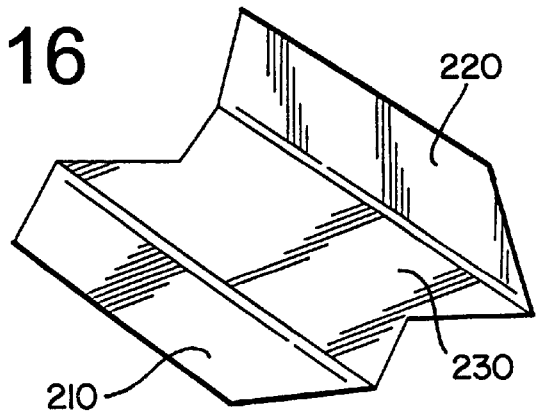
FIG. 16 is a perspective view of the blank construction of FIG. 14 after a first fold to the blank.

Again, for clarity, FIGS. 14–21 showing the second adaptation 2, the first linear foldable joint 160 and the second linear foldable joint 170 are omitted. Turning to FIG. 14, a preferred embodiment of the second adaptation of a card display 2 for standing cards is shown, formed of the same blank 10. A contiguous substantially trapezoidal left side panel 210 having a right side (edge 211) is positioned contiguous and adjacent to the left side (edge 240) of the base section 230. The base section 230 and the left side panel 210 are foldably joined either along or adjacent to the left side 240 of the base 230 and the right side 211 of the left side panel 210 by a linear third foldable joint 260. A contiguous trapezoidal right side panel 220 having a left side (edge 221) is positioned contiguous and adjacent to the right side (edge 250) of the base section 230. The base section 230 and the right side panel 220 are foldably joined either along or adjacent to the right side 250 of the base 230 and the left side 221 of the right side panel by a linear fourth foldable joint 270. The linear third foldable joint 260 is substantially parallel to the linear fourth foldable joint 270.

Use

As stated previously, the user has the option of folding the display stand 10 to one of two adaptations shown 1, 2.

Use of the First Adaptation

Shown in detail in FIGS. 7–9A, the first option is to form a card display 1 from the blank 10 by folding the right side panel 120 along the joint 170 substantially perpendicular to the base section 130, and by folding the left side panel 110 along the joint 140 substantially perpendicular to base section 130 in such a way that the top edge 112 of right side panel 110 and the top edge 122 of left side panel 122 meet and touch.

Figure 9A:
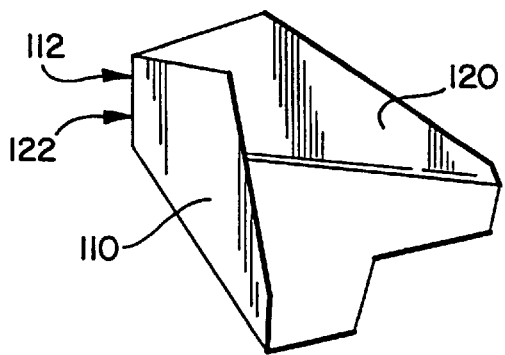
FIG. 9A is a perspective view of the blank construction of FIG. 7 after a first and second fold to the blank.
Figure 9B:
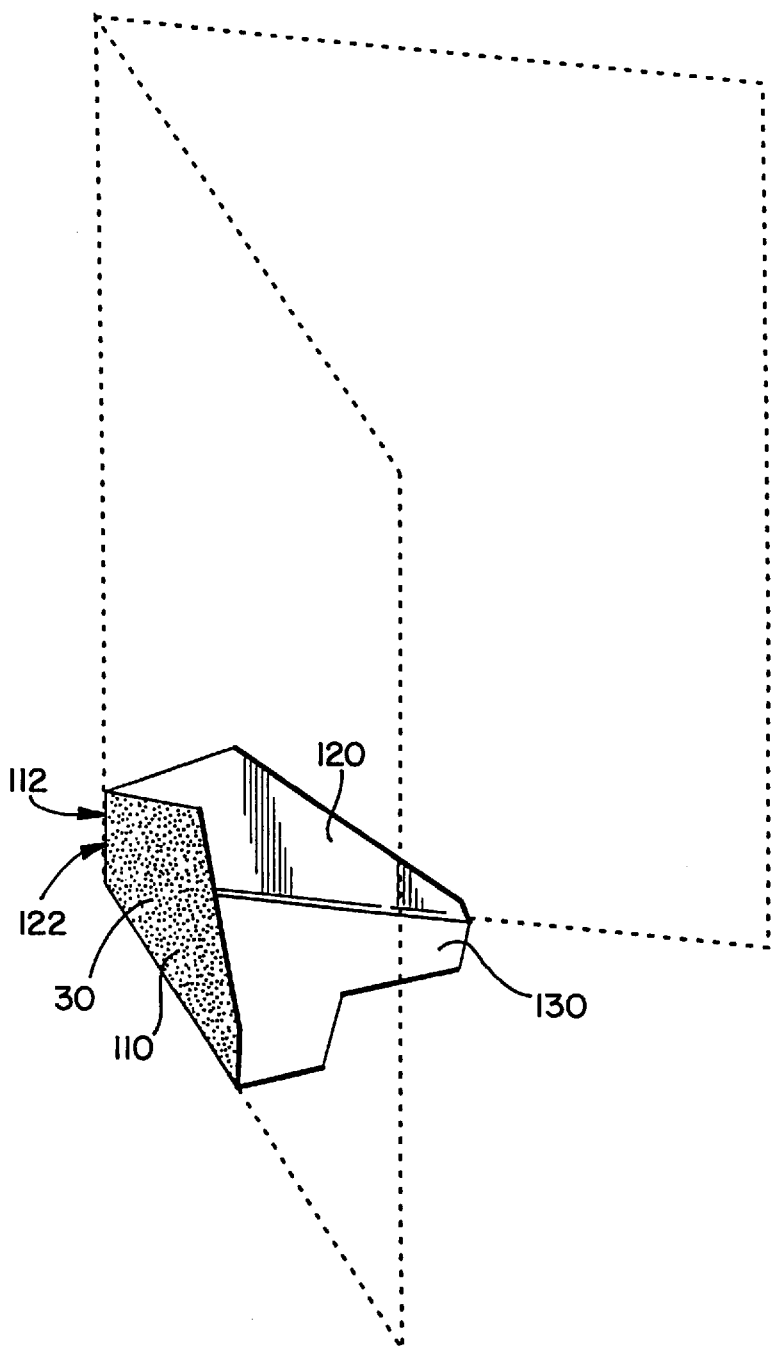
FIG. 9B is a perspective view of the first adaptation of the card display of FIG. 1B, with the protective liner removed, showing the card display in use with a card.
Figure 10:
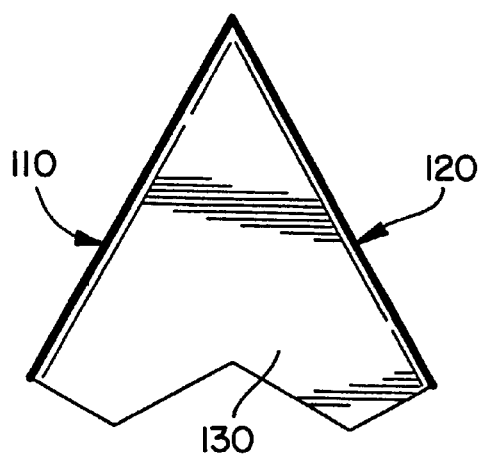
FIG. 10 is a top plan view of the first adaptation of the card display of FIG. 1A after a first and second fold to the blank.
Figure 11:
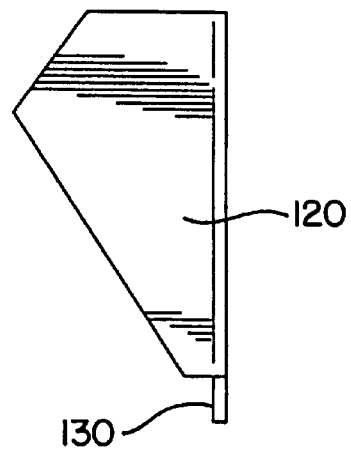
FIG. 11 is a right side elevation view of the card display of FIG. 1.
Figure 12:
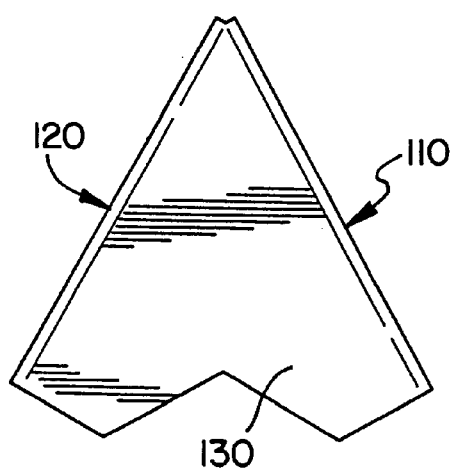
FIG. 12 is a bottom plan view of the card display of FIG. 1.
Figure 13:
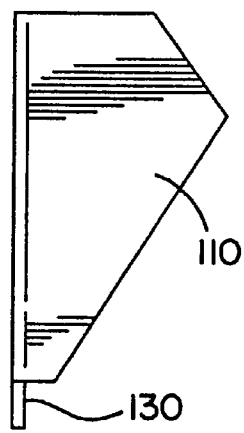
FIG. 13 is a left side elevation view of the card display of FIG. 1.

Next, as shown in FIG. 9B, the protective release liner 50 is removed to expose the adhesive 30. The left side panel 110 and right side panel are attached to the left and right leaves of the card (shown in phantom) adjacent to the crease. The base section 130 is finally positioned on and applied above, below, along or adjacent to any horizontal or vertical surface for display of the card, such as on a mantelpiece or window sill.

Use of the Second Adaptation

Shown in detail in FIGS. 15–17A, the second option is to form a card display 2 from the blank 10 by folding the right side panel 220 along the joint 270 substantially perpendicular to the base section 230, and by folding the left side panel 210 along the joint 260 substantially perpendicular to base section 230 in such a way that the angles right side panel 220 and the left side panel 210 are acute (less than 90 degrees) to the base section 230 to form a generally U-shaped card display 2.

Figure 17A:
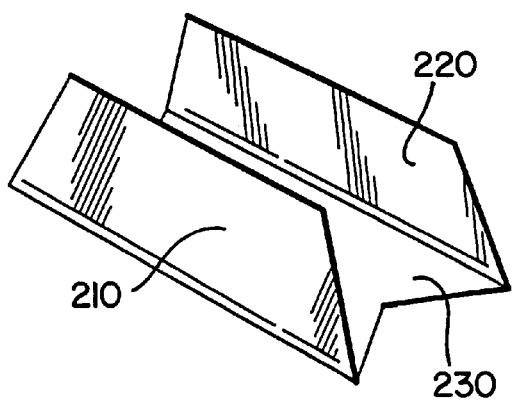
FIG. 17A is a perspective view of the blank construction of FIG. 14 after a first and second fold to the blank.
Figure 17B:
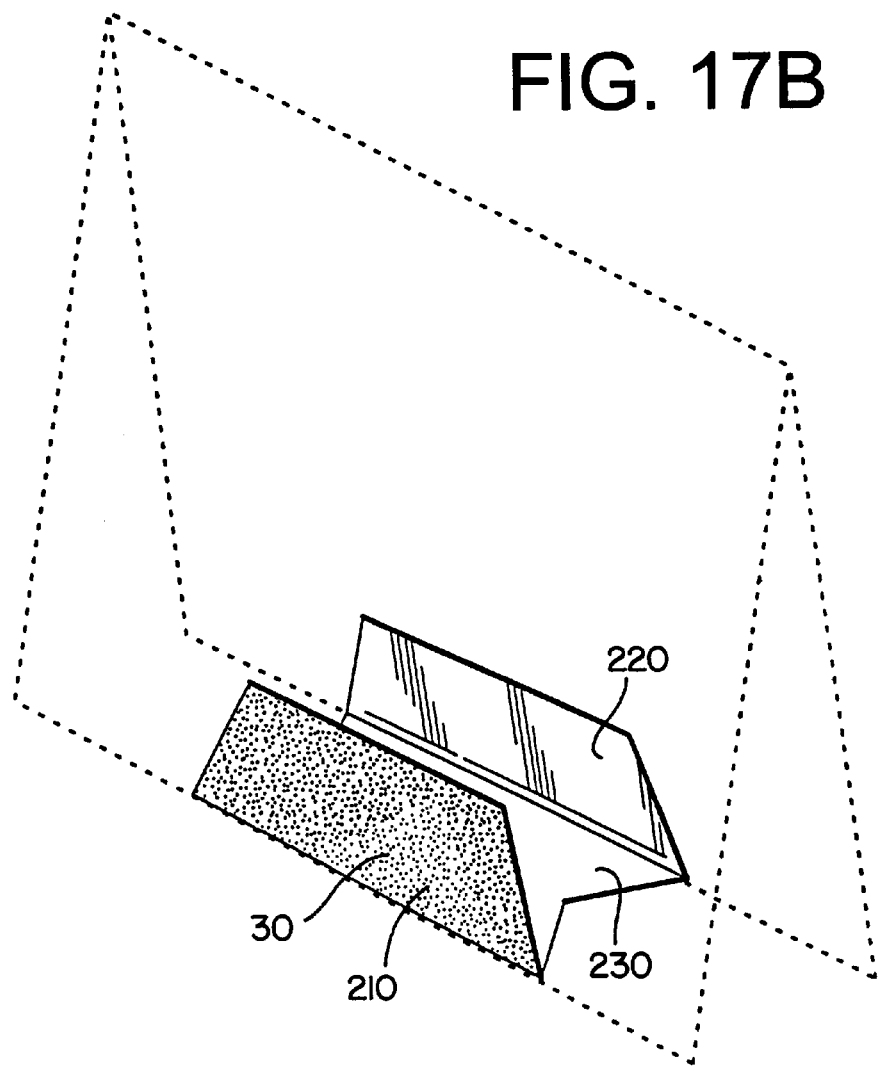
FIG. 17B is a perspective view of the card display of FIG. 2 showing the card display in use with a card.
Figure 18:
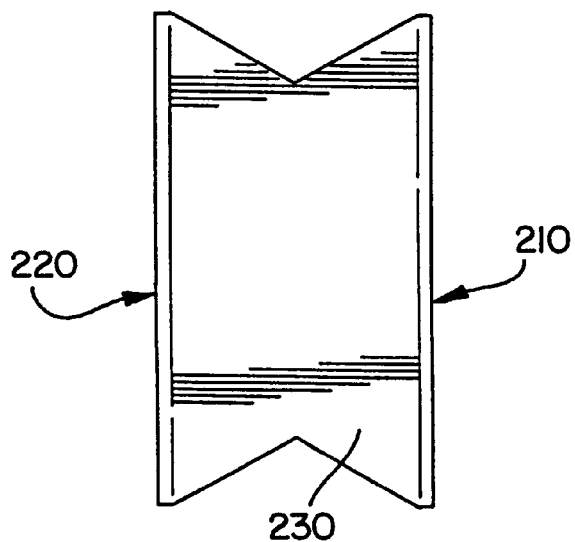
FIG. 18 is a top plan view of the card display of FIG. 2 after a first and second fold to the blank.
Figure 19:
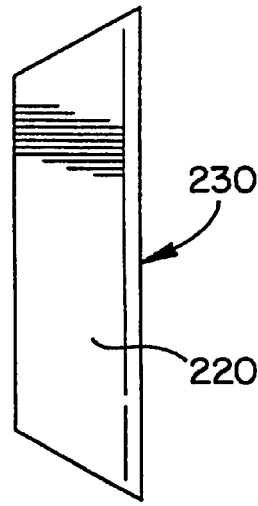
FIG. 19 is a right side elevation view of the card display of FIG. 2.
Figure 20:
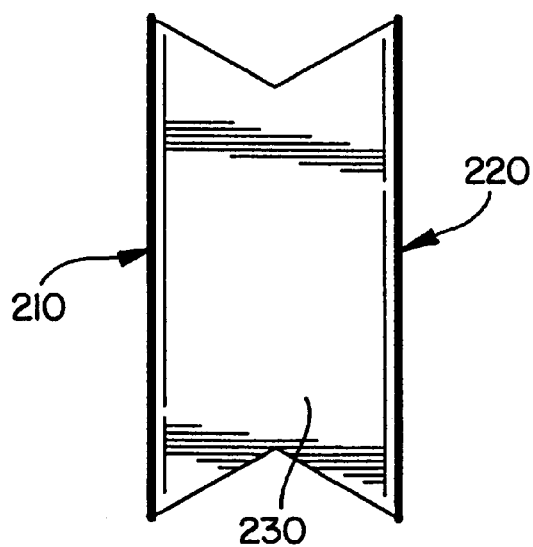
FIG. 20 is a bottom plan view of the card display of FIG. 2.
Figure 21:
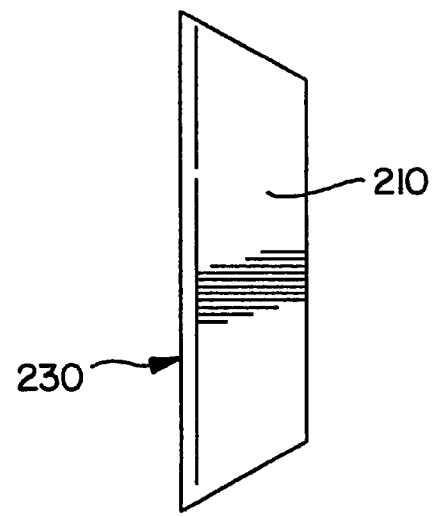
FIG. 21 is a left side elevation view of the card display of FIG. 2.

Next, as shown in FIG. 17B, the protective release liner 50 is removed to expose the adhesive 30. The left side panel 210 and the right side panel 220 are attached to the left and right leaves of the card (shown in phantom) parallel to the crease. The base section 230 is finally positioned on and applied above, below, along or adjacent to any horizontal or vertical surface for display of the card, such as on a mantelpiece or window sill.

Additional Embodiments

Figure 22:
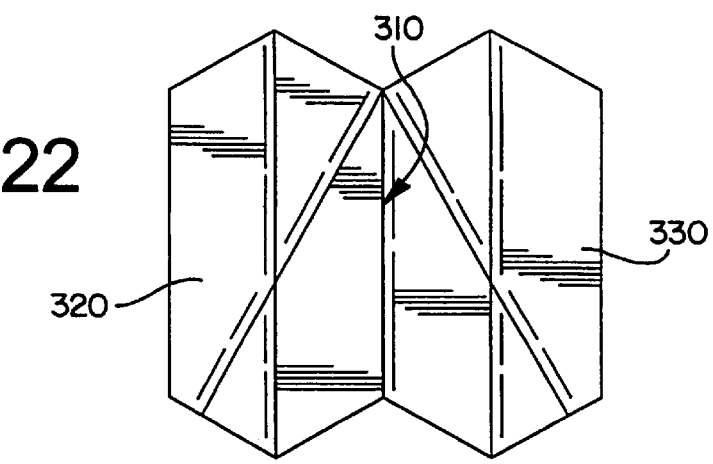
FIG. 22 is a top plan view of a second embodiment of a blank construction in the open, unfolded position used to construct a card display.

As shown in FIG. 22, the blank 10 of the first embodiment of the present invention may be further modified to include a fifth foldable joint 310. In this embodiment, the formed left side 320 and right side 330 are folded along this foldable joint 310 to augment and permit different widths with which both the first and second adaptations 1, 2 of the card display 10 are applied to the folded card.

Figure 23:
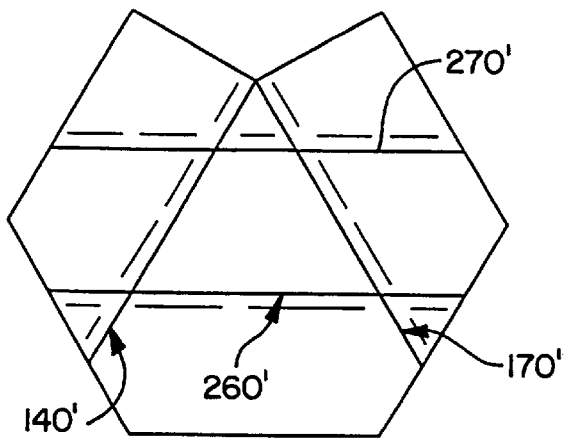
FIG. 23 is a top plan view of a third embodiment of a blank construction in the open, unfolded position used to construct a card display; and, FIG. 24 is a top plan view of a fourth embodiment of a blank construction in the open, unfolded position used to construct a card display.

Shown in FIG. 23, the foldable joints described above may be re-oriented to intersect one another and change the appearance of the blank and display without decreasing the efficiency of use.

Figure 24:
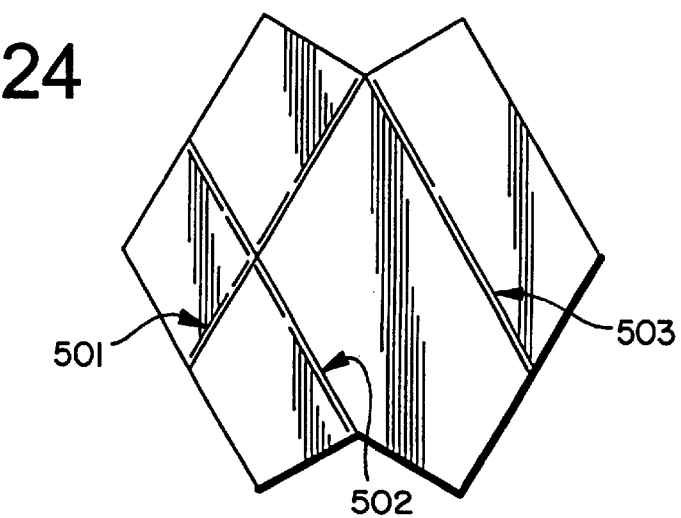

FIG. 24 shows a second foldable joint 502 cooperating with both a first foldable joint 501 or a third foldable joint 503 to form the wedge shaped card display (adaptation 1) or a U-shaped card display (adaptation 2).

In constructing the above described blank and card stand, it has been found that a heavy white cover stock with a gauge of approximately 0.0018 inches or 0.0020 inches is ideal. Adhesives for application on the bottom of the blank construction and card stand include conventional "removable" or "repositionable" adhesives, which are a combination of permanent and removable "transfer" or adhesives with "carriers," recognizable by those skilled in the art.

It has been determined that all necessary indicia can be printed on the top surface of the blank, and that adhesive can be applied in a subsequent step, both of which steps are followed by the die-cutting or similar process of extracting the blank from the medium of manufacture.

In practice, it has been further found that one can print all necessary indicia on the top surface of the blank. However, once folded and affixed to a card according to the desires of the user, the blank/card stand is virtually invisible, substantially obscured by the card itself, and all surfaces that include adhesive are attached almost entirely to the inside of the card or the surface upon which the card is displayed. As a result of these attributes and the others described herein, the invention described herein preserves the "shelf life" of a displayed card while allowing the user to display a card in a manner in accord with, and in enhancement of, current display conventions.

While the specific embodiments have been illustrated and described, numerous modifications are possible without significantly departing from the spirit of the invention, and the scope of protection is only limited by the scope of the accompanying claims.

I claim:

1. A blank construction for making a card stand comprising:
    a base panel having adhesive means on one surface adapted to attach to a separate surface;
    an integral first panel having adhesive means on one surface adapted to attach one leaf of a card and foldable perpendicular to said base panel along a first foldable joint;
    an integral second panel having adhesive means on one surface adapted to attach to another leaf of a card and foldable perpendicular to said base panel along a second foldable joint;
    an integral third panel having adhesive means on one surface adapted to selectively attach said third panel to one leaf of a card and foldable perpendicular to said base panel along a third foldable joint; and,
    an integral fourth panel having adhesive means on one surface adapted to selectively attach said fourth panel to one leaf of a card and foldable perpendicular to said base panel along a fourth foldable joint.

2. The blank construction of claim 1 wherein the third foldable joint and the fourth foldable joint are positioned parallel to one another.

3. The blank construction of claim 1 further including a centrally positioned fifth foldable joint bisecting an acute angle formed by the positioning of the first foldable joint and second foldable joint and parallel to the third foldable joint and fourth foldable joint.

4. The blank construction of claim 1 wherein the first foldable joint intersects with the third foldable joint.

5. The blank construction of claim 4 wherein the second foldable joint intersects with a fourth foldable joint.

6. The blank construction of claim 5 wherein the first foldable joint and the second foldable joint are positioned to form an acute angle.

7. A card stand for cooperating with and displaying a card and having a first and second surface comprising:
   a base section;
   a first pair of gripping means connected to the base section;
   a second pair of gripping means connected to the base section, the first and second pairs of gripping means intersecting each other;
   a first pair of bending means separating the first pair of gripping means from the base section;
   a second pair of bending means separating the second pair of gripping means from the base section; and,
   a centrally positioned fold (a) bisecting an acute angle formed by the positioning of the first pair of gripping means and (b) parallel to the second pair of gripping means.

8. The card stand of claim 7 wherein each of the first pair of gripping means are positioned at an acute angle to one another.

9. The card stand of claim 7 wherein the each of the second pair of gripping means are positioned parallel to one another.

10. The card stand of claim 7 wherein each gripping means is a flap.

11. The card stand of claim 7 wherein each bending means is a fold.

12. The card stand of claim 7 wherein the base section is adapted to include adhesive means integral with one surface for attaching said base to a surface.

13. The card stand of claim 7 wherein the first pair of gripping means and the second pair of gripping means are adapted to include adhesive means on one surface for attaching said gripping means to the leaves of a card.

14. A card stand for cooperating with and displaying a card and having a first and second surface comprising:
   a base section;
   at least two gripping means adapted for each gripping means to attach to a leaf of a card;
   a first bending means separating one gripping means from the base section;
   a second bending means separating the other gripping means from the base section, said gripping means being positioned to form an acute angle with one another, the gripping means and the base section having an adhesive on one side thereof; and,
   a third gripping means having a third bending means separating it from the base and a fourth gripping means having a fourth bending means separating it from the base, the third bending means intersecting the first bending means and the fourth bending means intersecting the second bending means and the third and fourth bending means being substantially parallel to one another.

15. The card stand of claim 14 wherein each gripping means is a flap.

16. The card stand of claim 14 wherein the bending means are folds.

17. The card stand of claim 14 wherein the base section is adapted to include adhesive means on one surface for attaching said base to a separate surface.

18. The card stand of claim 14 wherein the one gripping means and the other gripping means are adapted to include adhesive means on one surface.

19. The gripping means of claim 14 wherein said third and fourth gripping means are positioned parallel to one another.

20. A card stand for cooperating with and displaying a card and having a first and second surface comprising:
   a base section;
   a first and a second gripping means forming an acute angle to one another and adapted to attach said gripping means to leaves of a card;
   a third bending means separating a third gripping means from the base section; and,
   a fourth bending means separating a fourth gripping means from the base section, said third and fourth gripping means being positioned parallel to one another and, the first gripping means intersecting the third gripping means and the second gripping means intersecting the fourth gripping means.

21. The card stand of claim 20 wherein the gripping means is a flap.

22. The card stand of claim 20 wherein the bending means is a fold.

23. The card stand of claim 20 wherein the base section is adapted to include adhesive means integral with one surface for attaching said base to a surface.

24. The card stand of claim 20 wherein the third gripping means and fourth gripping means are adapted to include adhesive means integral with one surface for attaching said gripping means to the leaves of a card.

25. The gripping means of claim 20 wherein said gripping means are positioned at an acute angle to one another.

26. A blank construction having first and second surfaces for making a card stand comprising:
   a base panel having adhesive means on the first surface adapted to attach to a separate surface;
   an integral first panel having adhesive means on the first surface adapted to attach to one leaf of a card and foldable perpendicular to said base panel along a first foldable joint; and,
   an integral second panel having adhesive means on the first surface adapted to attach to another leaf of a card and foldable perpendicular to said base panel along a second foldable joint, an apex being formed between the first foldable joint and the second foldable joint being less than 90 degrees.

27. The blank construction of claim 26 further including an integral third panel having adhesive means on the first surface adapted to selectively attach said third panel to one leaf of a card and foldable perpendicular to said base panel along a third foldable joint and an integral fourth panel having adhesive means on the first surface adapted to selectively attach said fourth panel to one leaf of a card and foldable perpendicular to said base panel along a fourth foldable joint.

28. The blank construction of claim 27 wherein the first foldable joint intersects with the third foldable joint and the second foldable joint intersects with the fourth foldable joint.

29. The blank construction of claim 28 wherein the first foldable joint and the second foldable joint are positioned to form an acute angle and the third foldable joint and the fourth foldable joint are positioned parallel to one another.

30. The blank construction of claim 27 further including a centrally positioned fifth foldable joint bisecting the acute angle formed by the positioning of the first foldable joint and second foldable joint and parallel to the third foldable joint and fourth foldable joint.

* * * * *